F. L. DESENS & W. H. HODGE.
CAR STEP.
APPLICATION FILED NOV. 25, 1911.
1,042,895.
Patented Oct. 29, 1912.
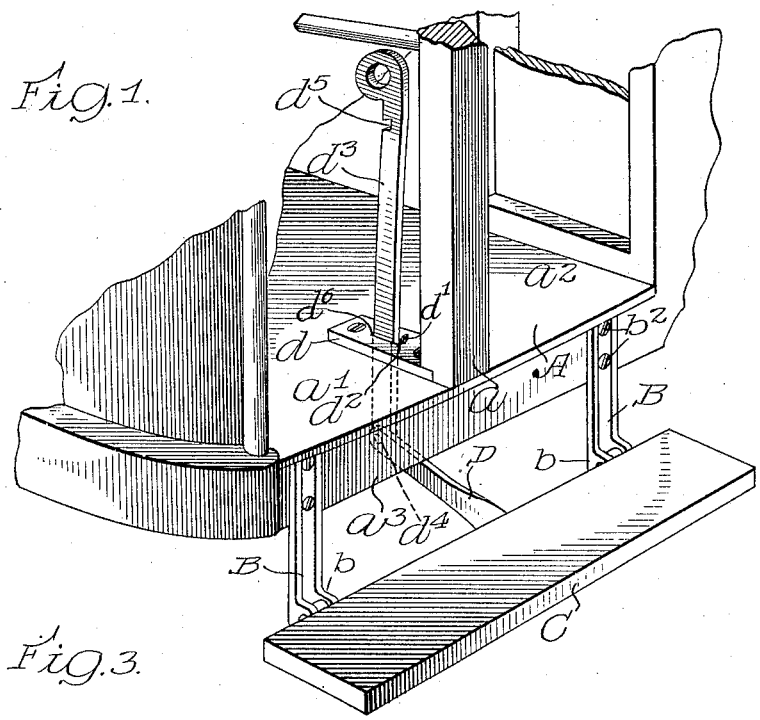
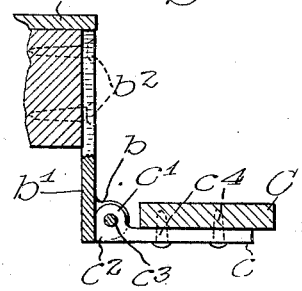
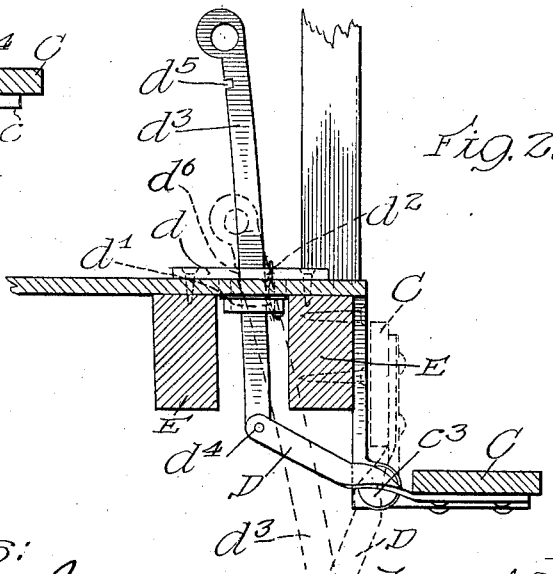
Witnesses:
G. T. Domarus Jr.
Geo. F. Schmidt
Inventors
Frank L. Desens and
William H. Hodge
By Arthur F. Durand
Attorney
COLUMBIA PLANOGRAPH CO., WASHINGTON, D. C.

UNITED STATES PATENT OFFICE.

FRANK L. DESENS AND WILLIAM H. HODGE, OF KANKAKEE, ILLINOIS.

CAR-STEP.

1,042,895. Specification of Letters Patent. Patented Oct. 29, 1912.

Application filed November 25, 1911. Serial No. 662,262.

*To all whom it may concern:*

Be it known that we, FRANK L. DESENS and WILLIAM H. HODGE, citizens of the United States of America, and residents of Kankakee, Kankakee county, Illinois, have invented a certain new and useful Improvement in Car-Steps, of which the following is a specification.

Our invention relates to car steps adapted more particularly for use on street cars.

Generally stated, the object of our invention is to provide a simple and comparatively inexpensive car step that can be folded up and out of the way when not in use.

Special objects are to provide a folding car step that can be easily and conveniently operated by the conductor or motorman on the car; to provide a folding car step having an operating connection which can be conveniently disposed out of the way behind one of the posts or uprights on the platform of the car; to provide a folding car step that will immediately drop to a horizontal position when the operating connection therefor is kicked by the foot of the conductor or motorman standing on the platform of the car; and to provide certain details and features of improvement tending to increase the general efficiency of a folding car step of this particular character.

To these and other useful ends, our invention consists in matters hereinafter set forth and claimed.

In the accompanying drawings—Figure 1 is a perspective of a portion of a street car platform provided with a folding step embodying the principles of our invention. Fig. 2 is a transverse section through the said car step and platform, taken on a line near the center thereof, showing the raised position of the step in dotted lines. Fig. 3 is a similar section taken on a line at one end of the said car step and platform.

As thus illustrated, the street car is of the "pay as you enter" kind, having a platform A at each end thereof, which platform is provided at one side with an upright post $a$ that divides the space into "in" and "out" openings $a'$ and $a^2$, in the usual and well known manner. A pair of drop straps B are attached to the sill or side $a^3$ of the platform, and are provided at their lower ends with pintle bearings $b$. The step C is provided on its under side with straps $c$ that have their inner ends formed with pintle bearing portions $c'$, in the manner shown more clearly in Fig. 3. These portions $c'$ are formed with corners or shoulders $c^2$ that engage the flat vertical portions $b'$ of the straps B, when the step is down, whereby the hinges thus provided can only open to an extent to bring the straps B and $c$ at right angles to each other, as shown in the drawings. Each hinge is provided with a pintle $c^3$, and the straps $c$ have bolts or screws $c^4$ by which they are secured to the step. The drop straps B have screws or bolts $b^2$ by which they are secured to the side of the platform. With this arrangement the step can be folded up flatwise against the side of the platform, as shown in dotted lines in Fig. 2, or may assume a horizontal position for use in the manner shown.

The connection for operating the folding step C consists of an arm D secured to the under side of the step and projecting under the platform of the car. A slotted plate $d$ is secured to the top of the platform at a point immediately back of the post $a$, said plate being provided with a spring $d'$ at the outer end of the slot $d^2$ formed therein. A vertically disposed bar $d^3$ slides up and down in the said slot, and has its lower end pivotally connected at $d^4$ with the end of the arm D, whereby the upper end of said bar $d^3$ can be used as a handle for manually manipulating the folding step. To hold the step in raised or folded position, the bar $d^3$ is provided with a notch $d^5$ adapted to engage the edge $d^6$ in the guide way in which the bar works up and down. To lower the step, the conductor or motorman simply kicks the upper end of the bar $d^3$, thus disengaging it from the said edge, and the weight of the step is then sufficient to enable it to fall outwardly of its own accord to a horizontal position. In this way the operating connection is conveniently and advantageously placed out of the way, and is of a character to enable the conductor or motorman to raise or lower the step at will. Preferably, as shown, the inner end of the arm D is somewhat above the plane of the step when the latter is lowered to a horizontal position. In this way, the end portion of the arm D is always beneath the platform, even after the step is raised to a vertical position, whereby the bar $d^3$ is permitted to slide up and down without deviating very materially from a vertical position. Thus the said bar $d^3$ can be raised quite close to the post or upright $a$, in the manner shown, and can be moved up and down between the beams or sills E of the platform of the car. Thus the step C, which may be made of some weight, is adapted to gravitate to a horizontal position when released. When in horizontal position, the step holds the bar $d^3$ in elevated position.

It is obvious, of course, that the bar $d^3$ may be placed at other points on the platform, or behind any other upright portion of the platform construction, depending upon the particular arrangement and character of the car. In other words, the operating connection composed of the arm D and bar $d^3$ may be arranged at either end of the step, in any suitable manner, without departing from the spirit of our invention. For this reason, we do not limit ourselves to the exact construction shown and described.

The spring $d'$ holds the bar $d^3$ against the edge $d^6$, and in this way the said spring and edge coöperate to form a spring catch for engaging the notch $d^5$ to lock the step in raised or folded position.

What we claim as our invention is:

1. In combination with a car, of a step hinged to the platform of the car and normally tending to gravitate to its operative position, said step being provided with an arm extending inwardly under the car platform, a push rod pivotally connected to the inner end of said arm extending upwardly through the car platform, and means for automatically locking said push rod at the lower extremity of its movement.

2. In combination with a car, of a step hinged to the platform of the car and normally tending to gravitate to its operative position, said step being provided with an arm extending inwardly under the car platform, a push rod pivotally connected to the inner end of said arm extending upwardly through the car platform, and means for automatically locking said push rod at the lower extremity of its movement, said locking means consisting of a notch formed in the bar at its upper end, a lock plate on the platform adapted to engage in said notch, and a spring normally forcing the lifting rod into engagement with said lock plate.

3. In combination with a car, the platform of the car being provided with a hole adjacent to the entrance, a lock plate fastened to the floor of the car and provided with a hole registering with the hole in the platform, and a spring confined in the hole in said lock plate, of a step hinged to the platform and normally tending to gravitate to its operative position, an arm attached to said step, extending in under the platform, and a push rod pivotally connected to the inner end of said arm and extending upwardly through the holes in the platform and the lock plate, said spring normally pressing against one edge of said push rod and forcing its opposite edge into continuous engagement with the edge of the lock plate, and said push rod being provided with a notch at its upper end for engagement with the edge of the lock plate when the said rod is pushed down, the spring serving to automatically bring about this engagement.

FRANK L. DESENS.
WILLIAM H. HODGE.

Witnesses:
  B. H. ROLLINS,
  E. SPRAKER.

Copies of this patent may be obtained for five cents each, by addressing the "Commissioner of Patents, Washington, D. C."